United States Patent
Henley et al.

(10) Patent No.: US 7,468,097 B2
(45) Date of Patent: Dec. 23, 2008

(54) METHOD AND APPARATUS FOR HYDROGEN PRODUCTION FROM GREENHOUSE GAS SATURATED CARBON NANOTUBES AND SYNTHESIS OF CARBON NANOSTRUCTURES THEREFROM

(75) Inventors: Don Henley, Denton, TX (US); Timothy J. Imholt, Carrollton, TX (US)

(73) Assignee: University of North Texas, Denton, TX (US)

( * ) Notice: Subject to any disclaimer, the term of this patent is extended or adjusted under 35 U.S.C. 154(b) by 484 days.

(21) Appl. No.: 11/189,908

(22) Filed: Jul. 26, 2005

(65) Prior Publication Data

US 2006/0021510 A1    Feb. 2, 2006

Related U.S. Application Data

(60) Provisional application No. 60/591,481, filed on Jul. 27, 2004.

(51) Int. Cl.
*C01B 3/24* (2006.01)
*B01J 19/12* (2006.01)

(52) U.S. Cl. .......................... 95/139; 95/143; 423/248; 423/650; 977/842

(58) Field of Classification Search .................... 95/139, 95/143, 148; 423/248, 648.1, 650, 445 R, 423/448; 977/848, 962; 502/416, 526
See application file for complete search history.

(56) References Cited

U.S. PATENT DOCUMENTS

| | | | |
|---|---|---|---|
| 5,300,203 A | 4/1994 | Smalley | |
| 5,346,683 A * | 9/1994 | Green et al. | 423/447.2 |
| 5,424,054 A | 6/1995 | Bethune et al. | |
| 5,457,343 A | 10/1995 | Ajayan et al. | |
| 5,589,152 A | 12/1996 | Tennent et al. | |
| 5,626,650 A * | 5/1997 | Rodriguez et al. | 95/116 |
| 5,650,132 A | 7/1997 | Murata et al. | |
| 5,698,175 A | 12/1997 | Hiura et al. | |
| 6,063,243 A | 5/2000 | Zettl et al. | |
| 6,183,714 B1 | 2/2001 | Smalley et al. | |
| 6,231,980 B1 | 5/2001 | Cohen et al. | |
| 6,315,977 B1 | 11/2001 | Cantacuzene | |
| 6,500,238 B1 * | 12/2002 | Brandes et al. | 95/148 |
| 6,858,891 B2 | 2/2005 | Farnworth et al. | |
| 6,875,417 B1 * | 4/2005 | Shah et al. | 423/650 |
| 6,905,544 B2 | 6/2005 | Setoguchi et al. | |
| 2002/0007594 A1 | 1/2002 | Muradov | |

(Continued)

FOREIGN PATENT DOCUMENTS

JP    2003 212527 A    7/2003

OTHER PUBLICATIONS

PCT Notification of Transmittal of the International Search Report and the Written Opinion of the International Searching Authority, or the Declaration dated Dec. 22, 2006.

*Primary Examiner*—Frank M Lawrence
(74) *Attorney, Agent, or Firm*—Jackson Walker L.L.P.

(57) ABSTRACT

A method and apparatus for the production of hydrogen from carbon nanotubes saturated with hydrocarbon gas or greenhouse gas is described. The hydrogen that is produced is substantially free from carbon dioxide. Additionally, the method described is useful for converting the carbon elements of the hydrocarbon gas or greenhouse gas into a de novo synthesis of carbon nanotubes.

20 Claims, 3 Drawing Sheets

U.S. PATENT DOCUMENTS

| | | | |
|---|---|---|---|
| 2002/0134242 A1* | 9/2002 | Yang et al. | 95/107 |
| 2003/0129122 A1* | 7/2003 | Chen et al. | 423/447.3 |
| 2004/0253168 A1 | 12/2004 | Chu | |
| 2005/0098035 A1* | 5/2005 | Lemmon et al. | 95/116 |
| 2005/0130341 A1 | 6/2005 | Furukawa et al. | |

* cited by examiner

METHOD AND APPARATUS FOR HYDROGEN PRODUCTION FROM GREENHOUSE GAS SATURATED CARBON NANOTUBES AND SYNTHESIS OF CARBON NANOSTRUCTURES THEREFROM

RELATED APPLICATIONS

This application claims priority to U.S. Provisional Patent Application Ser. No. 60/591,481, entitled "Process and Apparatus for the Storage and Removal of Hydrocarbon and Greenhouse Gas Species from Carbon Nanotubes and the Nanosynthesis of Carbon Nanotubes Therefrom," filed on Jul. 27, 2004, having Henley, et al., listed as the inventors, the entire content of which is hereby incorporated by reference.

STATEMENT OF RIGHTS TO INVENTIONS MADE UNDER FEDERALLY SPONSORED RESEARCH

No federal grants or funds were used in the development of the present invention.

BACKGROUND

This invention is generally related to an apparatus and method of capturing, and storing hydrocarbon gas and greenhouse gas species within a carbon nanotube matrix. Additionally, methods are directed to the production of hydrogen without a substantial carbon dioxide byproduct. More specifically, this invention is related to a method that utilizes an initial amount of carbon nanotubes as a substrate to capture a hydrocarbon gas and/or a greenhouse gas, forming nanotubes saturated with a hydrocarbon gas or a greenhouse gas, or both. The nanotubes saturated with hydrocarbon gas or greenhouse gas can then be placed under a vacuum and exposed to microwave energy generating: (a) a release of hydrogen into a storage vessel; and (b) de novo synthesis of carbon nanotubes from the recycled carbon elements of the hydrocarbon gas or the greenhouse gas. The newly synthesized carbon nanotubes, in turn, become saturated with hydrocarbon gas or greenhouse gas, which can be exposed to microwave radiation and produce even more newly synthesized carbon nanotubes. This process represents an apparatus and method of making hydrogen with an industrial valuable byproduct, carbon nanotubes. Additionally, the process is substantially free from carbon contaminants and carbon dioxide production.

Hydrocarbon and Greenhouse Gas Production. Many chemical compounds found in the Earth's atmosphere act as "greenhouse gases." These gases allow sunlight to enter the atmosphere freely. When sunlight strikes the Earth's surface, some of it is reflected back towards space as infrared radiation (heat). Greenhouse gases absorb this infrared radiation and trap the heat in the atmosphere. Over time, the amount of energy sent from the sun to the Earth's surface should be about the same as the amount of energy radiated back into space, leaving the temperature of the Earth's surface roughly constant. However, there is growing concern in the scientific community that greenhouse gases are accumulating in Earth's atmosphere as a result of human activities, causing surface air temperatures and sub-surface ocean temperatures to rise. The concern that increases in global temperature over the past few decades are due to human activities directly. Additionally, increases in global temperatures have prompted international governments to monitor and/or reduce the amount of greenhouse gas emissions that are produced by industrialized nations.

Many gases exhibit "greenhouse" properties. Some of them occur in nature (e.g. water vapor, carbon dioxide, methane, and nitrous oxide), while others are exclusively human-generated (e.g. gases used for aerosols, HFCs, PFCs and $SF_6$). Most of the human-generated greenhouse gas emissions of carbon dioxide produced in the United States are a result of energy production, more specifically, energy-related usage of petroleum and natural gas. Another greenhouse gas emission, methane, comes from landfills, coal mines, oil and gas operations, and agriculture. Nitrous oxide is also emitted from burning fossil fuels and through the use of certain fertilizers and industrial processes.

Hydrogen Energy Production. There is a currently a need for hydrogen to play a greater role in the energy market because of the increasing demand for fuel cell systems and the growing demand for reduction of greenhouse gases and zero-emission fuels. Hydrogen production must keep pace with this growing market demand, but there are still some technical and infrastructure hurdles that first need to be overcome. Although hydrogen is the most abundant element on the planet, it is bound to other elements from which it must be separated before it can be used in energy production or as a chemical feedstock, etc. Thermo-chemical and electrochemical methods for hydrogen generation have been developed, however these processes are generally costly, energy-intensive, produce carbon dioxide, and not always environmentally friendly. Thus, hydrogen production in the United States is not generally used for energy production. For example, approximately 95% of the hydrogen produced in the United States today comes from carbonaceous raw materials, primarily fossil in its origin. However, only a fraction of the hydrogen produced is currently employed for energy purposes. The bulk of this hydrogen is used as chemical feedstock for petrochemical, food, electronics and metallurgical industries.

In the future, increased hydrogen production will most likely be met by conventional technologies, such as natural gas reformation. In these processes, hydrogen is produced and the carbon is converted to carbon dioxide and released to the atmosphere. With the growing concern of global climate change, alternatives to the atmospheric release of carbon dioxide are needed. Sequestration of carbon dioxide is an option but it is also energy intensive and expensive. Better methods of hydrogen production are needed, including environmentally friendly methods that do not produce carbon dioxide.

Reducing the demand for fossil resources remains a significant concern for most industrialized nations. Renewable resource based processes including solar or wind driven electrolysis and photolytic water splitting hold promise for clean hydrogen production. Such processes are desirable but considerable advance must be made before these processes are technologically feasible and economically competitive.

Carbon Nanotubes Science and Technology. Nanotechnology is based on a principle of building functional structures with chemistry and biology one atom at a time. The first report of a nanostructure was the Buckminsterfullerene, which is essentially a series of very large carbon molecules, the most common form of which is the $C_{60}$ molecule. Carbon nanotubes were discovered in 1991 and consist of fullerene-related structures of graphene cylinders closed at either end with caps containing pentagonal rings. Carbon nanotubes are a special class of what is widely referred to as nanostructure or a man-made structure in the physical size range of 1 to 100 nanometers ("nm"). Bulk quantities of hollow carbon nanotubes can be produced using an arc-evaporation technique. The experimental variables for producing nanotubes include: ambient pressure, electrode size, gap size, power, and flux density. U.S. Pat. No. 5,346,683 issued to Green, et al., on Sep. 13, 1994, titled "Uncapped and Thinned Carbon Nanotubes and Process," ("The '683 patent") indicates one method of producing carbon nanotubes. For example, carbon nanotubes were prepared in the '683 patent using a carbon arc. An arc was struck between two electrolytic grade graphite rods, 8 mm O.D., 15 cm length having a purity >99%, in 100 Torr of helium using a dc voltage of 30V and a current of 180-200 A. The anodic graphite rod evaporated and the cathodic graphite rod increased in length. Approximately 20-30 percent of the carbon vaporized from the anode distilled onto the cathode, resulting in a gain in length of the cathode of about 3-4 cm. The nanotube material was found at the black central core of the cathodic rod.

A multi-walled carbon nanotube ("MWNT") resembles a series of "pipes" within one another. Generally the outer tube of a MWNT is capped while the inner tubes are open. One MWNT can have a range of 2 to several hundred layers of pipes within one another. Even though the MWNT structures are interesting in a physical sense, in many ways their chemical and electronic properties are similar to common carbon structures. Although original MWNT were carbon structures, MWNTs have been formed from a wide variety of structures such as boron, nitride, and other compounds (e.g. U.S. Pat. Nos. 6,063,243, and 6,231,980). Since the discovery of the MWNT, an even more striking and profound discovery was made with the first observation of the single walled carbon nanotube ("SWNT"). The physical appearance of these structures are similar to the layered pipe structure of the MWNT, however, there is only one layer. One of the highlights of nanotube research has been the demonstration that SWNT can be opened and filled with a variety of materials ranging from single atoms (e.g. hydrogen fuel) to biological molecules.

Generally, in order to produce nanotubes, conditions of about 500 Torr and temperatures high enough to vaporize carbon should be met in an inert environment. One specific method for making SWNT is disclosed in U.S. Pat. No. 6,183,714 issued to Smalley, et al., on Feb. 6, 2001, titled "Method of Making Ropes of Single-Wall Carbon Nanotubes," ("the '714 patent"). The '714 patent provides a method of making single-wall carbon nanotubes by laser vaporizing a mixture of carbon and one or more Group VIII transition metals. Single-wall carbon nanotubes preferentially form in the vapor and the one or more Group VIII transition metals catalyzed growth of the single-wall carbon nanotubes. In one embodiment of the '714 patent invention, one or more single-wall carbon nanotubes are fixed in a high temperature zone so that the one or more Group VIII transition metals catalyze further growth of the single-wall carbon nanotube that is maintained in the high temperature zone. In another embodiment, two separate laser pulses are utilized with the second pulse timed to be absorbed by the vapor created by the first pulse. The '714 patent is specifically incorporated herein by reference. Additionally, nanotubes can be produced commercially, and these methods are known by a person of ordinary skill in the art and incorporated herein by reference (e.g. Helixmaterial, located in Richardson, Tex.; CNI, Houston, Tex.; and Hyperion Catalysis International located in Cambridge, Mass.).

Since the discovery of carbon nanotubes, a significant amount of application driven research has taken place. A portion of this research has been directed toward the use of these structures as storage matrices for various gaseous species such as hydrocarbon gases and greenhouse gases, which are known to be harmful to the environment.

One method of enclosing foreign material in a carbon nanotube is described in U.S. Pat. No. 5,457,343 issued to Ajayan, et al., on Oct. 10, 1995, titled "Carbon Nanotubule Enclosing a Foreign Material." ("the '343 patent"). The '343 patent provides a nanometer sized carbon tubule enclosing a foreign material. The carbon tubule comprises a plurality of tubular graphite monoatomic sheets coaxially arranged. The foreign material is introduced through a top portion of the carbon tubule. The introduction of the foreign material is accomplished after forming an opening at the top portion of the carbon tubule either by contacting the foreign material with the top portion of the carbon tubule together with a heat treatment or by an evaporation of the foreign material on the top portion of the carbon tubule together with the heat treatment. The foreign material is introduced only in a center hollow space defined by an internal surface of the most inner tubular graphite monoatomic sheet. The '343 patent is specifically incorporated herein by reference.

Microwave Energy. Microwaves are very short waves of electromagnetic energy that travel at the speed of light. Microwaves that are used in household microwave ovens are in the same family of frequencies as the signals used in radio and television broadcasting, and described in U.S. Pat. No. 2,495,429 issued to Spencer et al., on Jan. 24, 1950 and titled "Method of Treating Foodstuffs," ("the '429 patent"). The heart of every microwave oven is the high voltage system that generates microwave energy. The high-voltage components accomplish this by stepping up AC line voltage to high voltage, which is then changed to an even higher DC voltage. This DC power is then converted to the RF energy. The nucleus of the high-voltage system is the magnetron tube. Generally, a magnetron is a diode-type electron tube which is used to produce the about 2450 MHz of microwave energy. It is classed as a diode because it has no grid as does an ordinary electron tube. A magnetic field imposed on the space between the anode (plate) and the cathode serves as the grid. While the external configurations of different magnetrons will vary, the basic internal structures are the same. These include the anode, the filament/cathode, the antenna, and the magnets. In this invention, a 500 Watt 2.45 GHz microwave source was used to quickly heat carbon nanotubes in a vacuum system, but similar devices that can heat carbon material quickly may also be utilized.

When nanotubes having stored hydrocarbon gases or greenhouse gases are heated quickly enough, the hydrogen will be stripped from the molecules and ejected from the nanotubes into the vacuum system where the hydrogen can then be placed in a storage tank for some other future use or to produce a plasma. In contrast, the carbon elements of the hydrocarbon gases or greenhouse gases are not ejected but tend to form newly synthesized carbon nanostructures, specifically SWNTs and MWNTs. For example, when a 500 Watt 2.45 GHz microwave source was used to heat nanotubes having stored hydrocarbon gases or greenhouse gases, hydrogen was released and the remaining carbon material become additional carbon nanotubes. The types of new nanotubes formed depend upon whether a catalyst material is present or not. For example, when nanotubes were produced without a catalyst material, MWNTs are formed. In microwave far field experiments, utilizing methane saturated carbon nanotubes without a catalyst material, $C^{60}$ fullerenes were formed. In contrast, the addition of an iron catalyst leads to the formation of SWNTs. The present invention could also be used to produce cloned nanotubes from defective sites in an original carbon nanotube matrix.

NanoCarb-$H_2$™ Currently, hydrogen production from biomass is receiving much attention. Unfortunately, most of these processes have significant drawbacks. Herein, we propose a microwave-assisted process (NanoCarb-$H_2$)™ that converts organics, including but not limited to, methane, butane, propane, carbon monoxide, carbon dioxide etc., into hydrogen gas. The hydrogen gas can then be stored for use as a fuel. The carbon is converted into carbon nanotubes, which can be sold for use in industrial applications. The process obviates the necessity of having to sequester carbon dioxide since none is produced in the process. Thus, the process is substantially free of carbon dioxide production. The process is unique in a number of ways. Other processes require very high pressure and temperature in order to preclude the production of carbon dioxide. Such processes are generally energy intensive and complicated. In the current process, a specific diameter carbon nanotube was used as a substrate and is saturated with a hydrocarbon gas or greenhouse gas, and heated with a microwave generator under vacuum. The carbon from the organic compounds was cloned into additional carbon nanotubes having about the same diameter as the substrate nanotubes during the reaction, while hydrogen is split off, evolved and stored. For example, when methane is used as the reactant, a hydrogen to carbon ratio of approximately 4:1 is realized.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

SUMMARY

Figure 1:
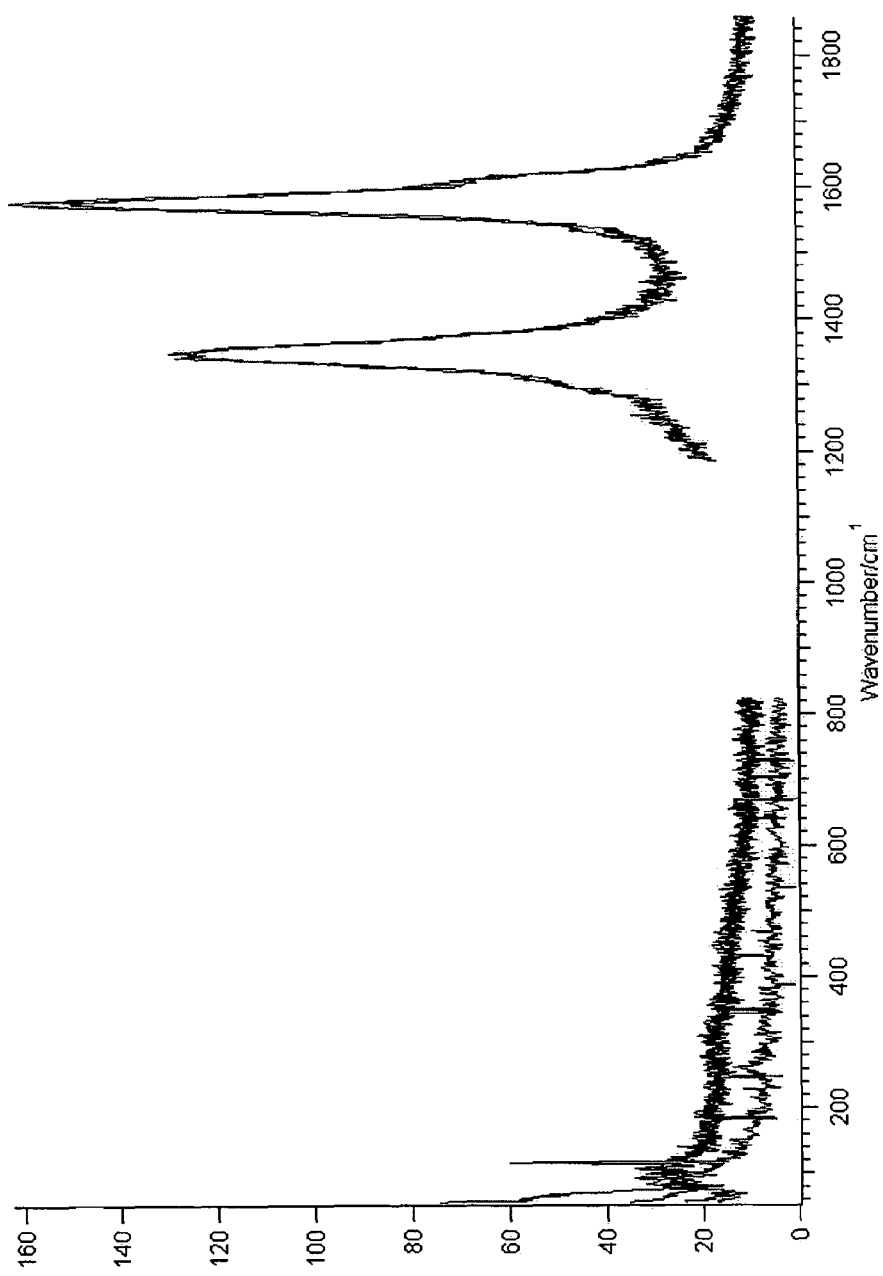
FIG. 1 shows a micro-Raman spectra of the multi-walled carbon nanotube structures formed by the process of the present invention.

A method and apparatus for the production of hydrogen from substrate carbon nanotubes that are saturated with hydrocarbon gas or greenhouse gas is described. The hydrogen produced is substantially free from carbon dioxide. Additionally, the method described is useful for converting the carbon elements of the hydrocarbon gas or greenhouse gas into a de novo synthesis of carbon nanotubes, which can further be saturated with hydrocarbon gas or greenhouse gas to produce even more hydrogen and even more carbon nanotubes.

A first aspect of this invention is an apparatus for saturating carbon nanotubes with hydrocarbon gas or attached greenhouse gas and then generating hydrogen gas and newly synthesized carbon nanotubes from the saturated carbon nanotubes. The apparatus uses a vacuum chamber, a nanotube holding chamber, a hydrogen storage chamber and a microwave generator. The vacuum chamber is in fluid communication with a gas inlet port, the nanotube holding chamber located inside the vacuum chamber and has a first end and a second end, wherein the first end is in fluid communication with the gas inlet port, and the second end is in fluid communication with a gas exit port. The hydrogen storage chamber in fluid communication with the gas exit port, and the microwave generator is aligned to discharge microwave energy that impinges on the saturated carbon nanotube. The microwave generator utilizes a 500W, 2.45 GHz magnetron tube located inside the vacuum chamber. The preferred nanotube holding chamber has a third end that is utilized for removal or storage of newly synthesized carbon nanotubes. Shut off valves are also included in the preferred embodiment. For example, a first shut-off valve interposing the gas inlet port and the nanotube holding chamber and a second shut-off valve interposing the nanotube holding chamber and the gas exit port are described A second aspect of this invention is a method of saturating a carbon nanotube with a hydrocarbon gas or a greenhouse gas. Saturating the carbon nanotube is completed by placing the carbon nanotube in a chamber having an atmospheric condition that allows the carbon nanotube to adsorb the hydrocarbon gas or the greenhouse gas, and exposing the carbon nanotube to the hydrocarbon gas or greenhouse gas (e.g. methane, butane, propane carbon monoxide, or carbon dioxide) for a first period of time (e.g. about 1 minute to about 2.5 hours, forming a saturated carbon nanotube. The preferred substrate carbon nanotube of this invention is a substantially single wall nanotube ("SWNT") prepared by arc discharge, laser ablation or chemical vapor deposition. Additionally, SWNTs created by the de novo synthesis of this process can be recycled as substrate carbon nanotubes for even more hydrogen and carbon nanotube production. The preferred substrate carbon nanotube of this invention has a diameter in the range of about 0.5 nm to about 1.5 nm, a more preferred diameter is 0.75 nm to about 1.25 nm. The preferred carbon nanotube has a length in the range of about 250 nm to about 5 cm.

A third aspect of this invention is a method of generating hydrogen gas from a saturated carbon nanotube having an attached hydrocarbon gas or attached greenhouse gas (e.g. methane, butane, propane carbon monoxide, or carbon dioxide). Generating hydrogen gas from a saturated carbon nanotube involves placing the carbon nanotube having the attached hydrocarbon gas under a vacuum forming a vacuum-nanotube; and heating the vacuum-nanotube to a first temperature (e.g. about 800 Kelvin to about 3,500 Kelvin) for a first period of time (e.g. about 5 second to about 10 seconds) generating hydrogen gas, un-saturated carbon nanotubes, and a de novo synthesized carbon nanotube. The saturated carbon nanotube can be reformed the by contacting the un-saturated carbon nanotube with hydrocarbon gas or greenhouse gas for a second period of time (e.g. about 1 minute to about 2.5 hours). Additionally, each of these steps can be repeated and/or scaled up for industrial production of hydrogen and de novo synthesis of carbon nanotubes. The addition of a catalyst (e.g. Fe or Mo) can influence that the outcome of a de novo synthesized carbon nanotube is preferably a single walled carbon nanotube. Additionally the preferred carbon nanotube of this invention has a diameter in the range of about 0.5 nm to about 1.5 nm, a more preferred diameter is 0.75 nm to about 1.25 nm. The preferred carbon nanotube has a length in the range of about 250 nm to about 5 cm. In a preferred embodiment, the hydrogen gas generated from the saturated carbon nanotube is substantially free from carbon dioxide.

DETAILED DESCRIPTION OF PREFERRED EMBODIMENTS

Terms: It will be readily apparent to one skilled in the art that various substitutions and modifications may be made in the invention disclosed herein without departing from the scope and spirit of the invention.

The term "a" or "an" as used herein in the specification may mean one or more. As used herein in the claim(s), when used in conjunction with the word "comprising", the words "a" or "an" may mean one or more than one. As used herein "another" may mean at least a second or more.

Synthesis of Single Walled Nanotubes ("SWNTs")

The more useful of the two types of nanotubes used as substrate material for this invention are SWNTs. The synthesis methods of the two types are generally similar, with the addition of various catalytic materials required for the growth of SWNTs, compared with the catalytic free methods of growth for MWNTs. Many methods for synthesizing nanotubes are known in the art. Some of the current methods of synthesis take on a number of different forms, including, but not limited to arc-discharge, laser ablation, and chemical vapor deposition methods.

Arc-discharge. The original synthesis process used for the production of SWNTs was a catalyst doped cathode/anode pair under arc discharge conditions in vacuum. This method was identical to that used for the original synthesis of the MWNT discovery with the addition of a metallic catalyst material. This method produced a very low yield of SWNTs and, as a result, many reports of improved processes have been reported.

Generally, the arc-discharge method employs two graphite rods for the cathode and the anode, which are disposed in the manufacturing apparatus containing a rare gas such as a helium or argon gas, and applies about ten volts between both the electrodes to carry currents of about ten amperes generating arc discharges that results in raising the temperature of the anode tip up to about 4000° C. At this temperature, the anode tip vaporizes and deposits soot containing nanotubes and fullerenes on the cathode and on the wall inside the apparatus. The soot contains the nanotubes and the fullerenes by some percentage. The soot containing the fullerenes are dissolved in an organic solvent such as benzene, and the fullerenes are separated and refined from the soot by the liquid chromatography method. Since the molecule size of the nanotube is quite large, a soluble organic solvent does not exist; and the nanotubes are separated and refined from the soot by the ultrasonic method or the heat treatment method. Generally, having anodes that contain nickel compounds or iron compounds will effect the catalytic action, and allow the efficient production of single-walled nanotubes.

In the foregoing arc discharge method, when the graphite rods are used for the electrodes, electrons and ions that exist in abundance in the arc plasma collide with the graphite rod of the anode. As the result, the temperature of the tip of the graphite rod rises to about 4000° C., ions and neutral particles of carbon are emitted in abundance. Although not wanting to be bound by theory, it is considered that the fullerenes and nanotubes are produced through the processes that deposit these ions and neutral particles on the cathode and on the inner wall of the chamber, and further deposit again on the anode.

However, in the arc plasma, multifariously complicated chemical reactions are produced by collisions with excited ions and electrons, and it is difficult to stably control the quantity and kinetic energy of the carbon ions. Consequently, the method produces abundant amorphous carbon particles and graphite particles together with the fullerenes and the nanotubes, which turn into soot with these mixed. Moreover, the concentration of the nanotubes and that of the fullerenes in the soot tend to be low, which are as low as several percent, as has been described in the '683 patent and the '714 patent.

Laser Ablation. The laser ablation method generally applies a pulsed laser (e.g. YAG laser) to a graphite sample, which generates plasma on the surface of the graphite to produce soot. Compared with the arc discharge method described above, the laser ablation method has an advantage in producing the $C_{60}$ fullerene with high efficiency, and in producing the nanotube and the fullerene with high purity. U.S. Pat. No. 5,300,203 issued to Smalley on Apr. 5, 1994, titled "Process for Making Fullerenes by the Laser Evaporation of Carbon," ("the '203 patent") describes the process of making the fullerenes generated by vaporizing carbon with a laser beam and maintaining the vaporized carbon at conditions selected to promote fullerene growth and formation. A similar apparatus has been used to make carbon nanotubes and or ropes of carbon nanotubes that supply carbon vapor to the live end of a carbon nanotube while maintaining the live end of a carbon nanotube in an annealing zone, as described in the '714 patent. Briefly, the '714 patent describes carbon nanotubes having at least one live end are formed when the target also comprises a Group VIII transition metal or mixtures of two or more Group VIII transition metals. In this application, the term "live end" of a carbon nanotube refers to the end of the carbon nanotube on which atoms of the one or more Group VIII transition metals are located. One or both ends of the nanotube may be a live end. A carbon nanotube having a live end is initially produced in the laser vaporization apparatus of this invention by using a laser beam to vaporize material from a target comprising carbon and one or more Group VIII transition metals and then introducing the carbon/Group VIII transition metal vapor to an annealing zone. Optionally, a second laser beam is used to assist in vaporizing carbon from the target. A carbon nanotube having a live end will form in the annealing zone and then grow in length by the catalytic addition of carbon from the vapor to the live end of the carbon nanotube. Additional carbon vapor is then supplied to the live end of a carbon nanotube to increase the length of the carbon nanotube.

The carbon nanotube that is formed is not always a single-wall carbon nanotube; it may be a multi-wall carbon nanotubes having two, five, ten or any greater number of walls (concentric carbon nanotubes). Preferably, though, the carbon nanotube is a single-wall carbon nanotube and this invention provides a way of selectively producing (10, 10) single-wall carbon nanotubes in greater and sometimes far greater abundance than multi-wall carbon nanotubes.

The annealing zone where the live end of the carbon nanotube is initially formed should be maintained at a temperature of 500° C. to 1500° C., more preferably 1000° C. to 1400° C. and most preferably 1100° C. to 1300° C. In embodiments of the '714 patent where carbon nanotubes having live ends are caught and maintained in an annealing zone and grown in length by further addition of carbon (without the necessity of adding further Group VIII transition metal vapor), the annealing zone may be cooler, 400° C. to 1500° C., preferably 400° C. to 1200° C., most preferably 500° C. to 700° C. The ° C. The pressure in the annealing zone should be maintained in the range of 50 to 2000 Torr, more preferably 100 to 800 Torr and most preferably 300 to 600 Torr. The atmosphere in the annealing zone will have carbon. Normally, the atmosphere in the annealing zone will also have a gas that sweeps the carbon vapor through the annealing zone to a collection zone. Any gas that does not prevent the formation of carbon nanotubes will work as the sweep gas, but preferably the sweep gas is an inert gas such as helium, neon, argon, krypton, xenon, radon, or mixtures of two or more of these. Helium and Argon are most preferred. The use of a flowing inert gas provides the ability to control temperature, and more importantly, provides the ability to transport carbon to the live end of the carbon nanotube. In some embodiments of the '714 patent, when other materials are being vaporized along with carbon, for example one or more Group VIII transition metals, those compounds and vapors of those compounds will also be present in the atmosphere of the annealing zone. If a pure metal is used, the resulting vapor will comprise the metal. If a metal oxide is used, the resulting vapor will comprise the metal and ions or molecules of oxygen.

Although not wanting to be bound by theory, an artesian will avoid the presence of too many materials that kill or significantly decrease the catalytic activity of the one or more Group VIII transition metals at the live end of the carbon nanotube. For example, it is known that the presence of too much water ($H_2O$) and/or oxygen ($O_2$) will kill or significantly decrease the catalytic activity of the one or more Group VIII transition metals. Therefore, water and oxygen are preferably excluded from the atmosphere in the annealing zone. Ordinarily, the use of a sweep gas having less than 5 wt %, more preferably less than 1 wt % water and oxygen will be sufficient. Most preferably the water and oxygen will be less than 0.1 wt %.

The formation of the carbon nanotube having a live end and the subsequent addition of carbon vapor to the carbon nanotube are all generally accomplished in the same apparatus. Generally, the apparatus comprises a laser that is aimed at a target comprising carbon and one or more Group VIII transition metals, and the target and the annealing zone are maintained at the appropriate temperature, for example by maintaining the annealing zone in an oven. A laser beam may be aimed to impinge on a target comprising carbon and one or more Group VIII transition metals where the target is mounted inside a quartz tube that is in turn maintained within a furnace maintained at the appropriate temperature. As noted above, the oven temperature is most preferably within the range of 1,100° C. to 1,300° C. The tube need not necessarily be a quartz tube; it may be made from any material that can withstand the temperatures (1000° C. to 1500° C.). Alumina or tungsten could be used to make the tube in addition to quartz.

Chemical Vapor Deposition ("CVD"). CVD can be used to make either SWNT or MWNT, and produces them by heating a precursor gas and flowing the heated gas over a metallic or oxide surface with a prepared catalyst (typically a nickel, iron, molybdenum or cobalt catalyst). One method is described in U.S. Pat. No. 6,331,209 issued to Jang, et al., on Dec. 18, 2001, titled "Method of Forming Carbon Nanotubes," ("the '209 patent"). The '209 patent describes a method of forming purified carbon nanotubes from which graphitic phase or carbon particles are removed, using a high-density plasma. Carbon nanotubes are grown on a substrate using a plasma chemical vapor deposition method at a high plasma density of $10^{11}$ cm$^{-3}$ or more. The carbon nanotube formation includes: growing a carbon nanotube layer on a substrate to have a predetermined thickness by plasma deposition; purifying the carbon nanotube layer by plasma etching; and repeating the growth and the purification of the carbon nanotube layer. For the plasma etching, a halogen-containing gas (e.g. a carbon tetrafluoride gas) is used as a source gas. Generally, the substrate having the catalytic metal layer is put into a plasma chemical vapor deposition apparatus to grow a carbon nanotube layer. An inductively coupled plasma apparatus ("ICP") capable of generating high-density plasma by application of radio frequency ("RF") power can be used. The source gas of deposition plasma for the growth of the carbon nanotube layer may be a hydrocarbon series gas including carbon atoms, such as acetylene or benzene. More specifically methane ($CH_4$) was used and flowed at 10 sccm. At this time, helium (He) was supplied together at 10 sccm. For the growth of the carbon nanotube layer, RF power was maintained at 1 kW, the temperature of the substrate was maintained at 600° C. to 900° C., and the inner pressure of the apparatus was maintained at 10 to 1000 mTorr. In order to facilitate reactions for the growth of the carbon nanotube layer, a nitrogen ($N_2$) gas or hydrogen ($H_2$) gas may be added. The deposition plasma was maintained at a high density of $10^{11}$ cm$^{-3}$ or more, and the carbon nanotube layer was grown to a desired thickness in the range of 3 to 300 nm. The thickness of the carbon nanotube layer increased with an increase in deposition time, and the deposition time can be varied in the range of a few seconds to a few hundred seconds. In a plasma deposition mode, graphitic phase or amorphous carbon particles were also formed at the end or the sidewalls of the carbon nanotubes during the growth of the carbon nanotube layer, so that the density of pure carbon nanotubes being grown can be very low. When an amorphous silicon thin film and the catalytic metal layer are formed on the substrate, the catalytic metal diffuses into the amorphous silicon layer during the growth of the carbon nanotube layer, resulting in the metal-induction crystallized polysilicon layer on which a predetermined amount of the catalytic metal remains.

Purification

In some synthesis methods, such as electric arc discharge, the yield of SWNTs is very low. The yield will consist of a very few weight percentage of nanotube material, with the remainder being catalyst material and amorphous carbon. Using the apparatus and method of the present invention, the most pure SWNT nanotubes obtainable should be employed. In order to purify a raw or just recently synthesized sample of nanotubes, a variety of methods are used, however, a typical method is generally described below.

Under some circumstances the first step in purification of any nanotube sample is oxidation. This will render the amorphous unused catalyst material to be in such a state that it can later be easily removed from the sample. In order to remove the amorphous non-nanotube carbon material from the sample, it is continuously heated in an environment in the range of approximately 500° C. for several hours. Simultaneously, in an environment of Ar/$O_2$, much of the amorphous carbon will burn off of the sample and leave only nanotube and oxidized catalyst material. At this point the sample can be sonicated in an acid solution, for instance HCl, for several hours. This will allow removal of the remaining oxidized amorphous catalyst material. What remains is mainly SWNT material. A remaining material in the sample, other than carbon, can be a small piece of catalyst material trapped inside one of the ends of the individual SWNTs. The present invention comprises a apparatus and method of controlling an interaction of this trapped catalyst material with a magnetic field.

The various samples of single-walled carbon nanotubes employed as starting substrate material in this invention were obtained commercially from CNI, Houston, Tex. Other samples of carbon nanostructures were recycled from the de novo synthesized nanotubes formed using the apparatus and method of this invention. This included MWNT and $C^{60}$ fullerenes. The substrate nanotubes used in all cases were obtained from various commercial sources such as Nanoamorphous materials.

EXAMPLES

The following examples are provided to further illustrate this invention and the manner in which it may be carried out. It will be understood, however, that the specific details given in the examples have been chosen for purposes of illustration only and not be construed as limiting the invention.

Example 1

Carbon Nanotube Substrate. An initial amount of carbon nanotubes are needed for this invention. Carbon nanotubes that are synthesized by any of the conventional methods mentioned above are useful as the initial carbon nanotube substrate. Additionally, the carbon nanotubes that are synthesized by the method of this invention are also useful for initial carbon nanotube substrates. In other words, a small portion of carbon nanotubes are utilized as a substrate to initiate the synthesis process. Generally, any carbon nanotube substrate material can be used to initiate the synthesis of new carbon nanotubes, regardless of the process that was used to make them.

Usually, the length and diameters of the nanotubes that result from any synthesis of SWNTs are a result of the catalyst employed and the environmental conditions of the apparatus during synthesis. There are a large number of diameters in any sample of nanotubes, but there is typically some diameters that are present in a greater quantity than any other. The size of this prevailing quantity is normally referred to as the diameter of the sample. For example, a 1.1 nm sample will have nanotubes ranging from 0.7 nm to 1.3 nm typically, with the most common diameter being 1.1 nm. Although the workable the workable range of carbon nanotubes diameters for this invention was about 0.7 nm to about 1.4 nm, useful starting material for SWNT can be generally any diameter range.

Nanotube Gas Storage. The escape of hydrocarbons and greenhouse gases into the atmosphere poses many problems, including global warming. It has been observed that SWNTs have a natural adsorption affinity for these hydrocarbons, as well as, many of the greenhouse gases, most notably methane and carbon dioxide. If a SWNT sample is present in the area of either of these types of gases, the possibility that the two types of gases will become "attached", captured or adsorbed in some way to the SWNTs are high, assuming the carbon nanotube sample has not reached the point of saturation. Generally, the SWNTs are exposed to the hydrocarbon or greenhouse gases for a period of time, which is usually measured in minutes. Although not wanting to be bound by theory, the higher the pressure of these gases the less time it takes for them to saturate.

To improve the storage capabilities of SWNTs, they are slightly modified from their commonly occurring form. SWNTs normally form close ended tubes. However, it is possible by a number of methods, such as acid etching and oxidation, to open one or both ends of these carbon nanotubes. If these open ended tubes are at a sufficiently low temperature, they are known to demonstrate capillary effects which allow the inner portion of the tube to be filled, as well as, the outer surface volume between the tubes.

Implantation is another method by which the inner volume of carbon nanotubes can be used to store additional gases. If an atom or molecule is incident upon the surface of a nanotube with a high enough velocity it will enter the nanotube by causing a temporary small hole in the side of it. This allows the atom or molecule to enter the inside of the carbon nanotube and allow the interior matrix to hold more gas than if the outside only were filled.

If one of the gases, either hydrocarbon or greenhouse species, is trapped in the nanotube sample, it will tend to stay there until the tube is heated to several hundred degrees, typically in the range of 800° C. to 850° C., at which point the gas will detach itself from the nanotube sample. However, unless properly undertaken, the process of gas removal may lead to the escape of the gas, resulting in damage to the environment. While there are many conventional methods by which these gases can be removed from carbon nanotubes, the present invention has several advantages over the conventional methods.

Figure 3:
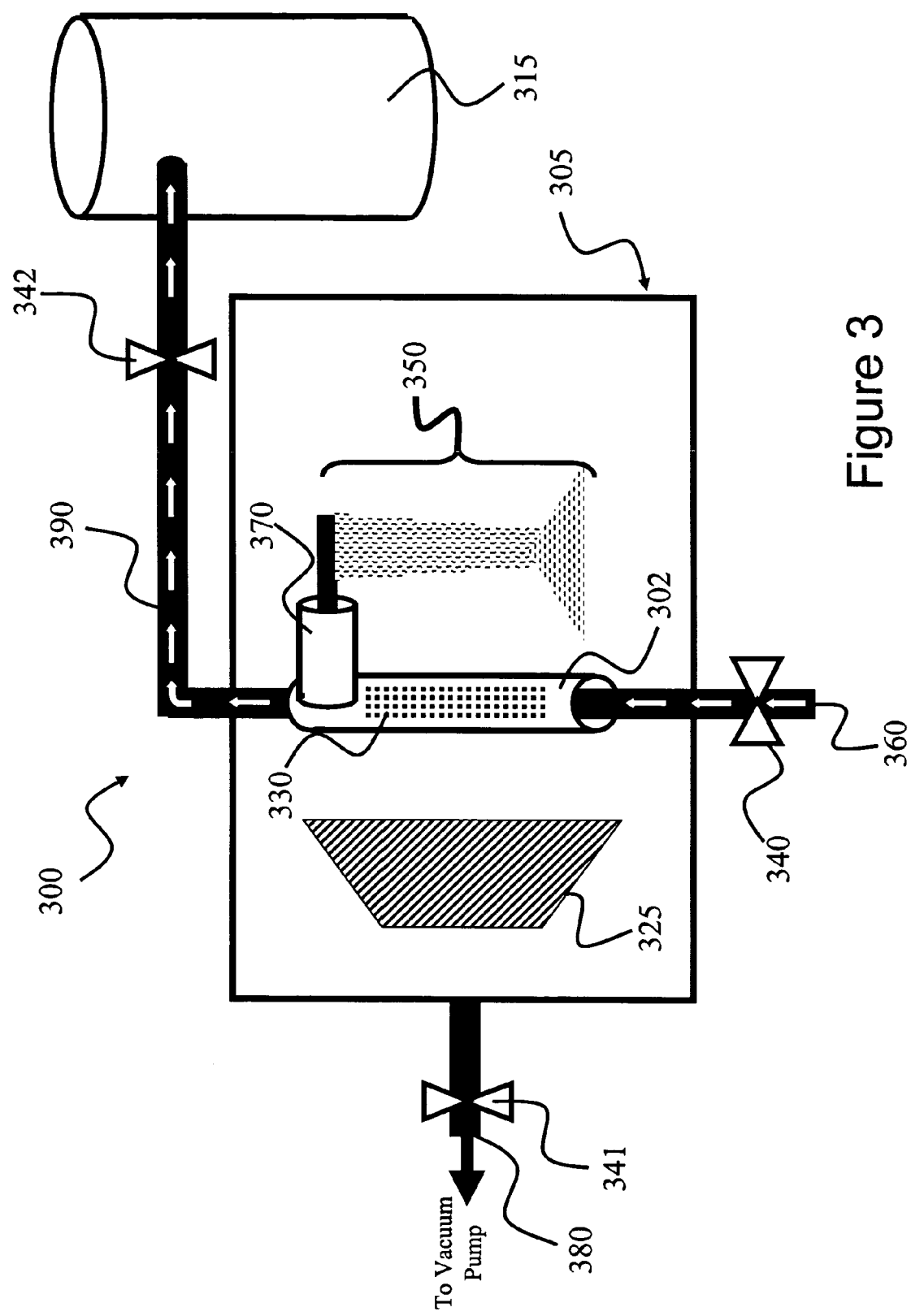
FIG. 3 shows the schematic of the NanoCarb-$H_2$™ Carbon Nanotube and Hydrogen Production System.

NanoCarb-$H_2$™ hydrogen production system. One embodiment of the apparatus for the current invention is illustrated in FIG. 3. The basic NanoCarb-$H_2$™ hydrogen production system 300 utilizes a vacuum chamber 305, a nanotube holding chamber 302, a hydrogen storage container 315 and a microwave source 325. In a first preferred embodiment, the vacuum chamber 305 is constructed of glass and has three connection ports, a vacuum pump connection port 380, a gas inlet connection port 360 and a hydrogen gas outlet connection port 390. Each of the inlet and outlet connection ports contain an interposed valve control or valve shutoff (e.g. 341, 340, and 342) to regulate the flow of various gases into or out of the vacuum chamber or components contained therein. One of skill in the art will appreciate that many configurations of inlet ports, exit ports and valve controls can be envisioned to accomplish the task of creating a vacuum in the vacuum chamber, introducing a gas into the vacuum chamber and removing a gas from the vacuum chamber, and the use of the specific configuration of FIG. 3 has been chosen for purposes of illustration only and should not be construed as limiting the invention.

The nanotube holding chamber 302 is constructed of a microwave permeable material (e.g. quartz) and is placed inside the vacuum chamber 305. Generally, the nanotube holding chamber 302 has a first end and a second end. In preferred embodiments, the nanotube holding chamber has a third end 370 that is utilized for removal or storage of newly synthesized carbon nanotubes 350 during industrial operation of the apparatus. The first end of the carbon nanotube holding chamber 302 is in fluid communication with the gas inlet connector 360. The gas inlet connector 360 and corresponding shut off valve 340 is used to introduce the hydrocarbon gas or green house gas into the nanotube holding chamber 302. The second end of the carbon nanotube holding chamber is in fluid communication with the gas outlet connector 390 and corresponding shut off valve 342, which is in fluid communication with the hydrogen storage container 315.

The microwave generator 325 of the invention is located inside the vacuum chamber 305, and is, preferably, a 500W magnetron tube capable of impinging 2.45 GHz of microwave energy to carbon nanotubes 330 in the carbon nanotube holding chamber 302.

In the present invention, a sample of about 10 mg of SWNTs was loaded into a suitable receptacle, in this case a cylindrical quartz tube, and then placed in vacuum of $10^{-4}$ Torr or lower to remove any gases previously adsorbed to the carbon nanotubes. The carbon nanotubes were then exposed to a suitable hydrocarbon gas (e.g. methane) for a period of time forming gas saturated carbon nanotubes. The period of time can be in the range of about 1 to about 30 minutes, but can extend longer depending on the dimensions of the system. For example, a larger system capable of holding more carbon nanotube material requires a longer time frame before saturated carbon nanotubes are formed. The longer times can be routinely determined by one of ordinary skill in the art.

The saturated carbon nanotubes were then heated quickly beyond the point where the gas desorbs. The temperature range is from about 600 to 3,500 Kelvin. If the saturated carbon nanotubes are heated quickly enough the hydrogen will be stripped from the molecules and will be ejected from the nanotubes into the vacuum system where it can then be recovered in a storage tank for some other future use or to produce a plasma. In the present invention, microwaves were used to quickly heat the saturated carbon nanostructures. The carbon elements of the saturated carbon nanotubes were not ejected but were converted or cloned into other newly synthesized carbon nanostructures, specifically SWNTs and MWNTs. More specifically, a 500 Watt 2.45 GHz microwave source was used and the remaining carbon material became additional carbon nanotubes. Newly synthesized nanotubes that are produced without some catalyst material can form MWNTs or $C^{60}$ fullerene molecules However, the addition of a catalyst (e.g. Mo, or Fe) allows SWNTs to form. The present invention could also be used to produce cloned nanotubes from defective sites in the original carbon nanotube matrix.

The embodiment shown and described above is only exemplary. Even though several characteristics and advantages of the present invention have been set forth in the foregoing description together with details of the invention, the disclosure is illustrative only and changes may be made within the principles of the invention to the full extent indicated by the broad general meaning of the terms used herein and in the attached claims.

Example 2

Carbon Nanotube Substrate. An initial amount of carbon nanotubes are needed as a substrate for this invention. Initially, SWNTs were purchased from CNI, Houston, Tex. However, carbon nanotubes produced by the method itself can be used as a substrate for this invention. The SWNTs that were purchased from CNI were ball milled to break the nanotubes into shorter sections or lengths. Although not wanting to be bound by theory, ball milling allowed the nanotubes to present the maximum number of free tube ends and active sites for the cloning of newly synthesized nanotubes. The newly synthesized nanotube structures of the current method closely matches the structures of the starting material. For example, the general diameter of the initial substrate is about the same as the diameter of the newly synthesized carbon nanotubes.

In order to ball mill nanotubes they were placed in a rotating mixer, which is similar to a paint shaker. Ball mills and methods thereof are common, and will not be discussed in detail. Briefly, the SWNTs having diameters of about 0.7 nm to about 1.4 nm were placed inside the rotating mixer with hardened steel ball bearings and then the mixer is turned on for a period of time resulting in ball-milled nanotubes. Although not wanting to be bound by theory, the long axis of the nanotubes is destroyed during the mixing process that leaves shorter nanotubes having more dangling bonds, which is preferred for this process.

The quartz nanotube holding chamber 302, containing the ball-milled carbon nanotubes 330, was then placed inside a vacuum chamber 305 of the NanoCarb-$H_2$™ hydrogen production system 300. A visually transparent vacuum chamber 305 facilitates observing the process and production, but one of ordinary skill in the art realizes that many other materials both transparent and non-transparent can be utilized to construct a vacuum chamber. The vacuum chamber is in fluid communication with a greenhouse gas supply that enters the quartz nanotube holding chamber 302 through a gas inlet connection 360 and shutoff valve 340. In a preferred embodiment, the greenhouse gas is methane. A hydrogen compressor and hydrogen storage chamber 315 is also in fluid communication with the quarts tube through the gas outlet connector 390 and corresponding shut off valve 342. A microwave generator 325 located in parallel to the quartz tube such that microwave energy is directed at the nanotubes within the quartz tube. The microwave generator 325 is capable of delivering 2.45 GHz of microwave energy to carbon nanotubes in the quartz nanotube holding chamber 302. The quartz nanotube holding chamber 302 also contains a port 370 for removing newly synthesized nanotubes 350.

In general, the NanoCarb-$H_2$™ hydrogen production system functions as follows: (a) approximately 10 milligrams of unsaturated ball-milled nanotubes having a diameter range of about 0.7 nm to about 1.4 nm were placed in a nanotube holding chamber 302 constructed of quartz. The quartz tube 302 was placed within the vacuum chamber 305; (b) the atmosphere of the vacuum chamber 305 and the storage chamber 315 was lowered in a range of about $10^{-4}$ Torr to about $10^{-4.5}$ Torr in order to remove any gases previously adsorbed to the nanotubes, the vacuum is created in the vacuum chamber 315 by closing valve 340 on the gas inlet, and opening the valve to the vacuum pump inlet 341; (c) once the appropriate vacuum has been reached, the pump valve is closed and the nanotubes are then saturated with a gas (e.g. methane) forming saturated carbon nanotubes. The gas enters the carbon nanotube holding chamber through the gas inlet 360, in a preferred embodiment, a valve 340 located on the gas inlet is opened connecting the gas supply with the vacuum chamber and (d) heating the saturated nanotubes using a microwave generator 325 for period of time, in the range from seconds to minutes, releases hydrogen gas and synthesizes new carbon nanotubes. A preferred microwave heating range is about 5 seconds to about 10 seconds releases hydrogen gas and synthesizes new carbon nanotubes, but may vary depending upon the configuration of the apparatus. The released hydrogen gas, resulting from the thermal splitting of the methane molecule, is then collected in the storage chamber 315 which may also be fitted with an associated gas compressor. The newly synthesized carbon nanotubes are discharged into the vacuum chamber or into a separate container designed for holding this production.

Spectral analyses was utilized to determine the components of the hydrogen gas expelled from the process. More specifically, a Raman spectra was obtained on the hydrogen gas collected to ensure that carbon dioxide was converted to carbon nanotubes and not released into the hydrogen gas. A Raman spectra was obtained before and after the process. FIG. 1 shows a micro-Raman spectrum of the multi-walled carbon nanotube structures formed by the NanoCarb-$H_2$™ process following the heating of greenhouse gas saturated nanotubes and release of hydrogen. As indicated, the hydrogen production being carbon dioxide free was shown with a residual gas analyzer by examining gaseous state atomic masses from 1 to 58.

Figure 2:
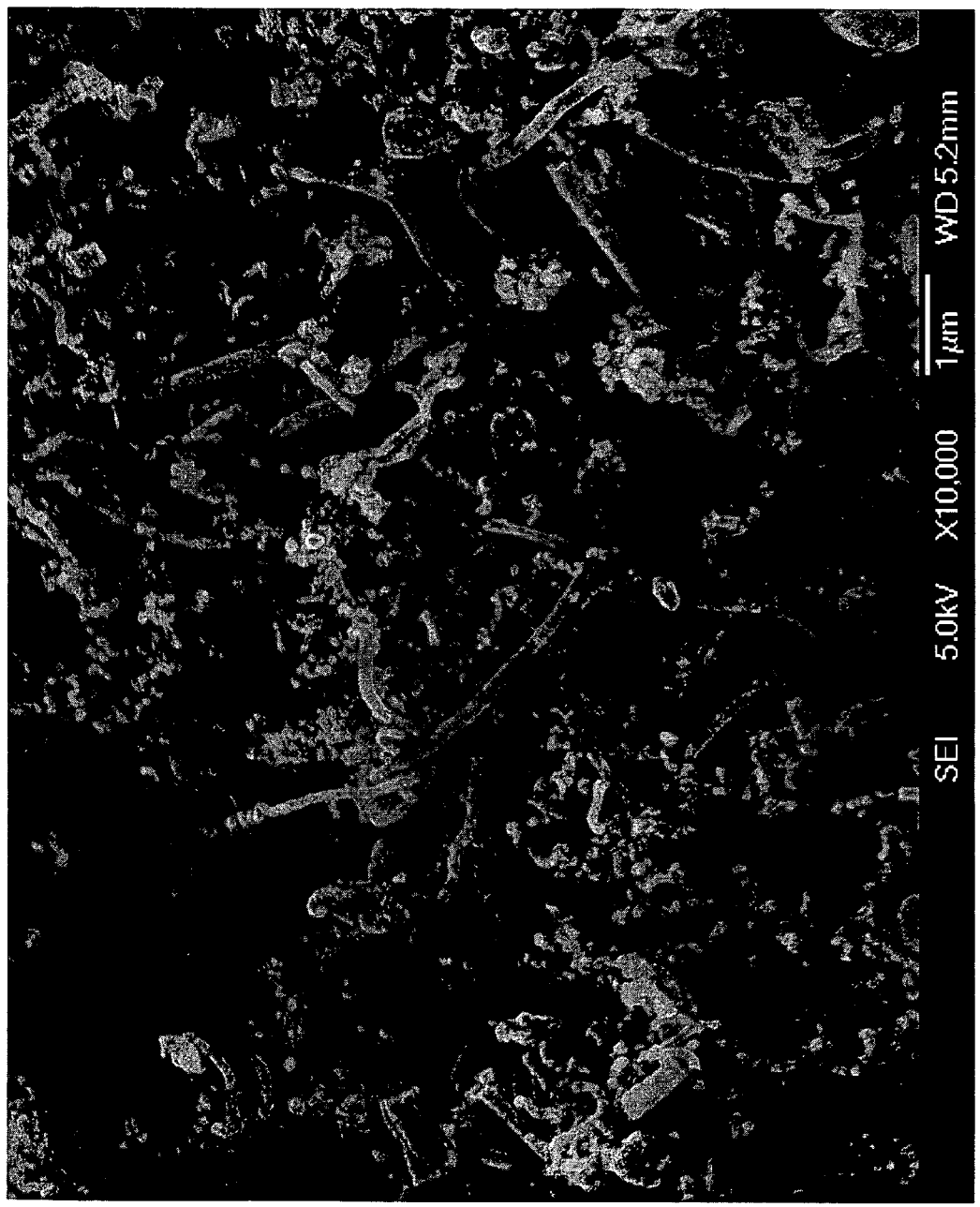
FIG. 2 shows a surface image taken by SEM of the newly formed carbon structures of the present invention.

FIG. 2 shows a surface image taken by SEM of the newly formed carbon structures. About 75 liters of methane was converted to about 40 grams of carbon nanotubes in about 60 minutes using this method. One skilled in the art can readily appreciate that the system of FIG. 3 can be altered by scaling up such that a larger industrial microwave oven could be employed and fitted with more than one waveguides and vacuum chambers in order to increase the greenhouse gas volumes converted to nanotubes and hydrogen gas products per unit time. Applying this process to industrial generators of greenhouse gases could feasibly reduce or remove such greenhouse gases from atmospheric point source discharges.

One skilled in the art readily appreciates that this invention is well adapted to carry out the objectives and obtain the ends and advantages mentioned as well as those inherent therein. Thus, it should be evident that the NanoCarb-$H_2$™ process and apparatus of the present invention substantially improves the art of hydrogen production without the production of carbon dioxide. Additionally, the method of producing newly synthesized carbon nanotubes from a hydrocarbon or greenhouse gas saturated substrate nanotube and microwave energy is an improvement on previously disclosed methods. The compositions, methods, procedures and techniques described herein are presently representative of the preferred embodiments and are intended to be exemplary and are not intended as limitations of the scope. Changes therein and other uses will occur to those skilled in the art which are encompassed within the spirit of the invention or defined by the scope of the pending claims.

REFERENCES CITED

The following references, to the extent that they provide exemplary procedural or other details supplementary to those set forth herein, are specifically incorporated herein by reference.

U.S. Patent Documents

U.S. Pat. No. 5,300,203 issued to Smalley on Apr. 5, 1994, titled "Process for Making Fullerenes by the Laser Evaporation of Carbon."

U.S. Pat. No. 5,424,054 issued to Bethune, et al., on Jun. 13, 1995 titled, "Carbon Fibers and Method for Their Production."

U.S. Pat. No. 5,457,343 issued to Ajayan, et al., on Oct. 10, 1995, titled "Carbon Nanotubule Enclosing a Foreign Material."

U.S. Pat. No. 5,589,152 issued to Tennent, et al., on Dec. 31, 1996, titled "Carbon Fibrils, Method for Producing Same and Adhesive Compositions Containing Same."

U.S. Pat. No. 5,698,175 issued to Hiura, et al., on Dec. 16, 1997, titled "Process for Purifying, Uncapping and Chemically Modifying Carbon Nanotubes."

U.S. Pat. No. 6,063,243 issued to Zettl, et al., on May 16, 2000, titled "Method for Making Nanotubes and Nanoparticles."

U.S. Pat. No. 6,183,714 issued to Smalley, et al., on Feb. 6, 2001, titled "Method of Making Ropes of Single-Wall Carbon Nanotubes."

U.S. Pat. No. 6,231,980 issued to Cohen, et al., on May 15, 2001, titled "$B_x C_y N_z$ Nanotubes and Nanoparticles."

U.S. Pat. No. 6,858,891 issued to Farnworth, et al., on Feb. 22, 2005, titled "Nanotube Semiconductor Devices and Methods for Making the Same."

U.S. Pat. No. 6,905,544 issued to Setoguchi, et al., on Jun. 14, 2005, titled "Manufacturing Method for a Carbon Nanomaterial, a Manufacturing Apparatus for a Carbon Nanomaterial, and Manufacturing Facility for a Carbon Nanomaterial."

U.S. Patent Application 20050130341 submitted by Furukawa, Toshiharu, et al., and published on Jun. 16, 2005, titled "Selective Synthesis of Semiconducting Carbon Nanotubes."

OTHER REFERENCES

1. S. Iijima, Nature, 354 (1991) 56.
2. I. W. Chiang, B. E. Brinson, A. Y. Huang, P. A. Willis, M. J. Brownikowski, J. L. Margrave, R. E. Smalley and R. H. Hauge. Journal of Physical Chemistry B, 105, 8297-8301 (2001).
3. M. J. Bronikowski, P. A. Willis, D. T. Colbert, K. A. Smith and R. E. Smalley. Journal of Vacuum Science & Technology A-Vacuum Surfaces & Films, 19, 1800-1805 (2001).
4. Q. Weizhong, L. Tang, W. Zhanwen, W. Fei, L. Zhifei, L. Guohua, L. Yongdan, Applied Catalysis A: General, 260 (2004) 223-228.
5. Q. Li, H. Yan, J. Zhang, Z. Liu, Carbon 42 (2004) 829-835.
6. D. Cao, J. Wu, Langmuir 2004, 20, 3759-3765.
7. R. C. Smith, J. D. Carey, C. H. P. Poa, D. C. Cox, and S. R. P. Silva, Journal of Applied Physics, 2004, 95, 6, 3153-3157.
8. T. D. Makris, R. Giorgi, N. Lisi, L. Pilloni, E. Salernitano, F. Sarto, M. Alvisi, Diamond and Related Material, 13 (2004) 305-310.
9. L. Piao, Y. Li, J. Chen, L. Chang, J. Y. S. Lin, Catalysis Today 74 (2002) 145-155.
10. G. W. Lee, J. Jurng, J. Hwang, Carbon, 42 (2004) 667-691.
11. R. Seidel, G. S. Duesberg, E. Unger, A. P. Graham, M. Liebau, F. Kreupl, Journal of Physical Chemistry B, 2004, 108, 1888-1893.
12. X. Chen, Y. Zhang, X. P. Gao, G. L. Pan, X. Y. Jiang, J. Q. Qu, F. Wu, J. Yan, D. Y. Song, International Journal of Hydrogen Energy, 29 (2004) 743-748.

What is claimed is:

1. An apparatus for generating and storing hydrogen gas from a saturated carbon nanotube having an attached hydrocarbon gas or attached greenhouse gas, comprising:
   (a) a vacuum chamber, wherein the vacuum chamber is in fluid communication with a gas inlet port;
   (b) a nanotube holding chamber located inside the vacuum chamber and having a first end and a second end, wherein the first end is in fluid communication with the gas inlet port, and the second end is in fluid communication with a gas exit port;
   (c) a hydrogen storage chamber in fluid communication with the gas exit port; and
   (d) a microwave generator aligned to discharge microwave energy that impinges on the saturated carbon nanotube having an attached hydrocarbon gas or attached greenhouse gas placed in the nanotube holding chamber.

2. The apparatus of claim 1, wherein the microwave generator comprises a 500 W, 2.45 GHz magnetron tube located inside the vacuum chamber.

3. The apparatus of claim 1, further comprising the nanotube holding chamber having a third end that is utilized for removal or storage of newly synthesized carbon nanotubes.

4. The apparatus of claim 1, further comprising a first shut-off valve interposing the gas inlet port and the nanotube holding chamber and a second shut-off valve interposing the nanotube holding chamber and the gas exit port.

5. The apparatus of claim 1, wherein the nanotube holding chamber is constructed of quartz.

6. The apparatus of claim 1, further comprising a refrigeration unit surrounding the hydrogen storage chamber, wherein the refrigeration unit is capable of cooling the hydrogen storage chamber to a temperature that liquefies hydrogen.

7. A method of generating hydrogen gas from a saturated carbon nanotube having an attached hydrocarbon gas or attached greenhouse gas, comprising:
   (a) placing the carbon nanotube having the attached hydrocarbon gas or greenhouse gas under a vacuum forming a vacuum-nanotube; and
   (b) heating the vacuum-nanotube to a first temperature in a first period of time generating hydrogen gas, an unsaturated carbon nanotube, and a de novo synthesized carbon nanotube.

8. The method of claim 7, further comprising:
(c) reforming the saturated carbon nanotube by contacting the un-saturated carbon nanotube with hydrocarbon gas or greenhouse gas for a second period of time; and
(d) repeating steps (a)-(d).

9. The method of claim 7, wherein the saturated carbon nanotube having an attached hydrocarbon gas or attached greenhouse gas was produced by: (a) placing a single walled carbon nanotube in a chamber having an atmospheric condition that allows the single walled carbon nanotube to adsorb the hydrocarbon gas or the greenhouse gas; and (b) exposing the single walled carbon nanotube to the hydrocarbon gas or greenhouse gas, forming the saturated carbon nanotube.

10. The method of claim 9, wherein the hydrocarbon gas or greenhouse gas comprise methane, butane, propane, carbon monoxide, or carbon dioxide.

11. The method of claim 7, wherein the saturated carbon nanotube is a single walled nanotube having a diameter in the range of about 0.5 nm to about 1.5 nm.

12. The method of claim 11, wherein the saturated carbon nanotube has a diameter in the range of about 0.75 nm to about 1.25 nm.

13. The method of claim 7, wherein the saturated carbon nanotube has a length in the range of about 250 nm to about 5 cm.

14. The method of claim 7, wherein the hydrogen gas generated from the saturated carbon nanotube is substantially free from carbon dioxide.

15. The method of claim 7, further comprising heating the vacuum-nanotube in the presence of a Fe or Mo catalyst.

16. The method of claim 15, wherein the de novo synthesized carbon nanotube comprises a single walled carbon nanotube.

17. The method of claim 7, wherein the first period of time is in the range of about 5 seconds to about 10 seconds.

18. The method of claim 8, wherein the second period of time is in the range of about 1 minute to about 2.5 hours.

19. The method of claim 7, wherein the first temperature is in the range of about 800 Kelvin to 3,500 Kelvin.

20. The method of claim 19, wherein heating the vacuum-nanotube uses a 500 W, 2.45 GHz magnetron tube.

\* \* \* \* \*